June 30, 1936.  C. A. McPHEE  2,045,666
SAFETYPIN
Filed Sept. 7, 1934
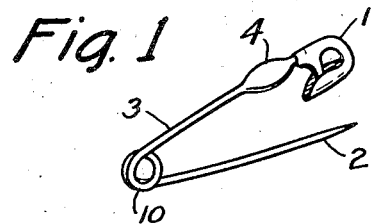
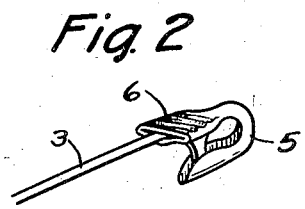
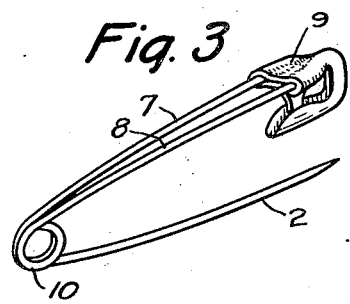
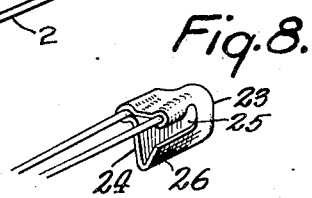
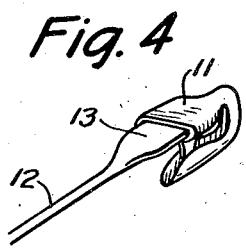
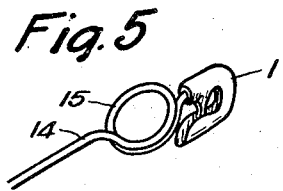
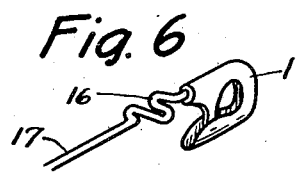
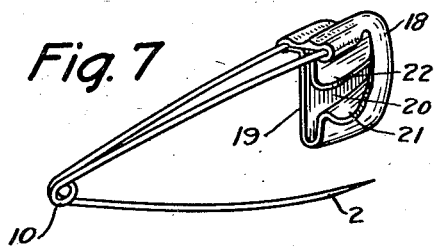
INVENTOR
Cameron A. McPhee
BY
James Harrison Bowen
ATTORNEY Patented June 30, 1936

2,045,666

UNITED STATES PATENT OFFICE 2,045,666

SAFETYPIN

Cameron A. McPhee, Seattle, Wash.

Application September 7, 1934, Serial No. 743,099

2 Claims. (Cl. 24—150)

The purpose of this invention is to provide a safety pin that may be opened and closed with one hand.

The invention is a safety pin having a flat space on the back thereof upon which the thumb or a finger may be placed to prevent the pin turning around while the point is opened or closed by a finger or thumb of the same hand.

Safety pins have been provided of many types and in many designs, and special pins have been made for various purposes, however, all ordinary safety pins are formed with a back of a single wire and it is practically impossible to obtain sufficient gripping surface thereon to hold the pin while opening or closing the point thereof, so that it is necessary to hold the pin with both hands and, altho this may not be considered objectionable, pins would be very much improved if they were so constructed that they may be readily opened and closed by one hand.

The object of the invention is, therefore, to provide means on the back of a safety pin which is sufficient to prevent the pin turning if held between the thumb and forefinger of a hand.

Another object is to provide means on the back of a safety pin for preventing the pin turning which does not increase the cost thereof.

Another object is to provide means on the back of a safety pin for preventing the pin turning when held by a hand, which may be formed of the same material of which the pin is made.

A further object is to provide means for providing a flat surface on the back of a safety pin which does not make the pin objectionable in use.

And a still further object is to provide a safety pin having means on the back for preventing turning thereof, which is of a simple and economical construction.

With these ends in view the invention embodies a safety pin having a flat surface at the back of the head, or adjacent the head, or in which the wire forming the back is bent or shaped to form a gripping surface.

Other features and advantages of the invention will appear from the following description taken in connection with the drawing, wherein:

Figure 1 is a view showing a safety pin of the preferred design in which the wire forming the back of the pin is flattened adjacent the head.

Figure 2 is a view showing the pin provided with a flat portion at the back of the head.

Figure 3 is a view showing a pin in which the back is formed of a double wire.

Figure 4 is a view showing the wire and back of the head flattened.

Figure 5 is a view showing a coil formed in the wire at the back of the head.

Figure 6 is a view showing the wire forming the back of the pin bent to form a gripping surface.

Figure 7 is a view showing a pin of an alternate design in which an opening is provided in one side of the head with the other side closed.

Figure 8 is a view showing another alternate design which is similar to that shown in Figure 7, except that a comparatively straight opening is provided in one side.

In the drawing the pin is shown as it may be made wherein numeral 1 indicates the head of a safety pin, numeral 2 the point, and numeral 3 the back.

It will be understood that the pin may be of any type, size or design, may be of any material or made of any color, and any means may be used for mounting the head on the pin, or a coil of any type may be provided at the opposite end, and any means may be used on or in combination with the coil.

In the design shown in Figure 1 the pin is formed in the usual manner and the back 3 is slightly flattened at the point 4 adjacent the back of the head, thereby providing a gripping surface upon which the thumb or a finger may be placed to hold the back of the pin. It will be understood that this surface may be formed by flattening the wire or additional material may be added by soldering or attached by any means. This space or material provides an area slightly greater than the width of the wire, and this may only extend for a short distance, as shown, or may extend midway of the wire, or may extend to the opposite end of the pin, if desired. This surface may also be substantially round, as shown, or of any shape. The point 2 may be formed by any means, and this may be held in the head in the usual manner.

In the design shown in Figure 2, the head, which is indicated by the numeral 5, is provided with a flat portion 6, and the back 3 may pass into and may be held in the head, in the usual manner. The pin is otherwise similar to the common safety pin.

In the design shown in Figure 3 the back of the pin is formed with two wires 7 and 8 and these may be used in combination with the head, shown in Figure 1, or the head may be flattened to provide a section 9, as shown in Figure 3, thereby providing a gripping surface on the head and wires. These wires may extend around the loop or coil, which is indicated by the numeral 10, or the extra wire may terminate at any point, or the back may be formed in any manner.

In the design shown in Figure 4 the head is provided with a flat section 11 and the back, which is indicated by the numeral 12, is also provided with the flat section 13, which may be held in the head, as shown. These parts may be of any shape or design and they may be arranged in any manner.

In the design shown in Figure 5 the back, which is indicated by the numeral 14, is formed with a coil 15, and the head 1 is the same as that shown in Figure 1, and the coil 15 may be formed by bending a wire around the circle, or a ring may be formed therein, or this may be shaped in any manner to provide a substantial flat gripping surface.

In the design shown in Figure 6 the wire is bent back and forth, forming a section 16 in the back, which is indicated by the numeral 17 and the head 1 is also substantially the same as that shown in Figure 1. The section 16 may extend for one or two turns, or may be extended the full length of the back, or may be arranged in any manner.

In the design shown in Figure 7 the pin is made somewhat similar to the pin shown in Figure 3 except that the coil, which is indicated by the numeral 10 is comparatively small and the head 18 is enlarged. The head 18 is formed with a closed side 19 and an opening 20 in the opposite side with outwardly extending flanges 21 and 22 adapted to guide the point into the opening 20 so that the pin may readily be held in one hand and with the thumb on the back of the pin the point 2 may readily be placed into the head by the forefinger. It will be understood that this type of head may be used with any of the other designs. It will also be understood that the head may be corrugated as shown with the corrugations running lengthwise thereof, or the corrugations may be placed across the head as shown in Figure 2 or arranged in any manner. It will also be understood that similar corrugations may be placed in the back of the head of the pins of any of the other designs and these corrugations may be longitudinal or transverse or may run at any angle or in any direction.

In the design shown in Figure 8 the pin is shown with a head 23 having a continuous flange 24 at one side with the opposite side provided with an opening 25 in which the lower part at the side of the head is bent slightly outward, forming an extension 26, similar to one side of a safety pin. It will be appreciated, however, that the lower part of the head may be bent or formed in any manner to accommodate the point, and openings of any type may be provided to facilitate snapping the point thereinto.

It will be understood that other changes may be made in the construction without departing from the spirit of the invention. One of which changes may be in the use of other means for forming a substantially flat gripping area on the back of a safety pin, another may be in the use of this flat gripping space in combination with a head or pin of any other type or design, and still another may be in the location of the flat or gripping surface, as it will be understood that this may be located at any other point or points.

The construction will be readily understood from the foregoing description. In use the pin may be provided in either of the designs, as shown, and it will be noted that it may readily be used in the usual manner, except that it may readily be opened or closed by gripping it between the thumb and forefinger of the same hand and the flat or gripping surface will make it possible to hold it so that it will not turn while being opened and closed. These pins may be made of any material and may be provided in different colors and may also be used for any purpose.

Having thus fully described the invention what I claim as new and desire to secure by Letters Patent, is:

1. A safety pin of the type having a head, a back and a point with the back and point formed of wire and having a coil at the end opposite the head forming a spring and in which the point may be held in the head by placing it through openings in the sides thereof, characterized in that the width of the back of the head is increased and the back comprises two wires with considerable space between the wires at the head and said wires tapering toward the coil at the opposite end where they join, thereby forming a flat gripping portion at the back of the head.

2. A safety pin of the type having a head, a back and a point with the back and point formed of wire and having a coil at the end opposite the head forming a spring and in which the point may be held in the head by placing it through openings in the sides thereof, characterized in that the back broadens out to a point adjacent the back of the head where it is of a substantial width and the back of the head is also flattened providing substantial width forming a gripping surface at the back of the head.

CAMERON A. McPHEE.